United States Patent
Matsumoto et al.

(10) Patent No.: US 8,691,460 B2
(45) Date of Patent: Apr. 8, 2014

(54) METHOD OF STOPPING OPERATION OF FUEL CELL SYSTEM

(75) Inventors: Yuji Matsumoto, Wako (JP); Koichiro Miyata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 13/405,360

(22) Filed: Feb. 27, 2012

(65) Prior Publication Data

US 2012/0225364 A1    Sep. 6, 2012

(30) Foreign Application Priority Data

Mar. 4, 2011   (JP) ................................. 2011-048003

(51) Int. Cl.
  *H01M 8/04*    (2006.01)
(52) U.S. Cl.
  CPC .......... *H01M 8/04231* (2013.01); *Y02E 60/521* (2013.01)
  USPC .......... 429/429; 429/414; 429/427; 429/428; 429/430; 429/432; 429/443
(58) Field of Classification Search
  USPC .................. 429/400, 408, 414, 427–433, 443
  See application file for complete search history.

(56) References Cited

U.S. PATENT DOCUMENTS

2006/0251937 A1* 11/2006 Inai et al. ................ 429/23
2007/0026277 A1*  2/2007 Ogawa et al. ............ 429/22
2009/0263679 A1* 10/2009 Robb et al. .............. 429/13

FOREIGN PATENT DOCUMENTS

JP    2004-022487    1/2004

* cited by examiner

*Primary Examiner* — Patrick Ryan
*Assistant Examiner* — Ben Lewis
(74) *Attorney, Agent, or Firm* — Ditthavong Mori & Steiner, P.C.

(57) ABSTRACT

A method includes an in-stop-mode power generating process of, if an instruction to stop an operation of a fuel cell is detected, stopping supply of a fuel gas, and supplying an oxide gas to the fuel cell to generate power from an oxide-gas supply apparatus, and then stopping power generation of the fuel cell, and a gas replacing process of, after the power generation of the fuel cell is stopped, activating the gas replacement apparatus at a predetermined timing to supply a replacement gas to the anode side of the fuel cell to replace the fuel gas on the anode side with the replacement gas.

8 Claims, 8 Drawing Sheets

METHOD OF STOPPING OPERATION OF FUEL CELL SYSTEM

CROSS-REFERENCE TO RELATED APPLICATIONS

The present application claims priority under 35 U.S.C. §119 to Japanese Patent Application No. 2011-048003, filed Mar. 4, 2011, entitled "Method of Stopping Operation of Fuel Cell System". The contents of this application are incorporated herein by reference in their entirety.

BACKGROUND OF THE INVENTION

1. Field of the Invention

The present disclosure relates to a method of stopping an operation of a fuel cell system.

2. Discussion of the Background

A fuel cell system acquires DC electric energy according to an electrochemical reaction of a fuel gas (gas essentially containing hydrogen, such as hydrogen gas) and an oxide gas (gas essentially containing oxygen, such as air) respectively supplied to an anode electrode and a cathode electrode. This system is of a stationary type, or is mounted in a fuel cell vehicle as an on-vehicle fuel cell system.

For example, a solid polymer fuel cell has an electrolyte membrane/electrode assembly (MEA) having an anode electrode and a cathode electrode provided on the respective side of an electrolyte membrane formed by a polymer ion-exchange film; the electrolyte membrane/electrode assembly is sandwiched by a pair of separators. A fuel gas passage for supplying a fuel gas to the anode electrode is formed between one of the separators and the electrolyte membrane/electrode assembly. An oxide gas passage for supplying an oxide gas to the cathode electrode is formed between the other separator and the electrolyte membrane/electrode assembly.

When the operation of the fuel cell is stopped, supply of the fuel gas and oxide gas is stopped. However, the fuel gas remains in the fuel gas passage, and the oxide gas remains in the oxide gas passage. When the operation-stop period of the fuel cell becomes long, therefore, the fuel gas and the oxide gas may pass through the electrolyte membrane, so that the fuel gas is mixed with the oxide gas to react therewith, thereby deteriorating the electrolyte membrane/electrode assembly.

To cope with the problem, a fuel cell system disclosed in, for example, Japanese Unexamined Patent Application Publication No. 2004-22487 (FIG. 1 and paragraph [0029]) shuts off the supply of a reaction gas to the anode side, and shuts off the supply of the reaction gas to the cathode side when the operation of the fuel cell is stopped. Further, the exhaust gas on the anode side is circulated to the upstream side through an anode-side circulation line, and the exhaust gas on the cathode side is circulated to the upstream side through a cathode-side circulation line, so that an electrochemical reaction in the fuel cell is maintained to generate power, thereby charging the battery with the generated power. Hydrogen in the exhaust gas on the anode side is consumed and oxygen in the exhaust gas on the cathode side is consumed this way, and a nitrogen gas is stored in a tank. The gases in the anode and cathode of the fuel cell are replaced with the nitrogen gas stored in the tank.

SUMMARY OF THE INVENTION

According to one aspect of the present invention, a method is for stopping an operation of a fuel cell system having a fuel cell to generate power according to an electrochemical reaction of an oxide gas supplied to a cathode side of an electrolyte membrane/electrode assembly with a fuel gas supplied to an anode side of the electrolyte membrane/electrode assembly, an oxide-gas supply apparatus to supply the oxide gas to the fuel cell, a fuel-gas supply apparatus to supply the fuel gas to the fuel cell, and a gas replacement apparatus to supply a replacement gas to the anode side of the fuel cell to replace the fuel gas on the anode side with the replacement gas. The method includes: an in-stop-mode power generating process of, if an instruction to stop an operation of the fuel cell is detected, stopping supply of the fuel gas, supplying the oxide gas to the fuel cell to generate power from the oxide-gas supply apparatus, and stopping power generation of the fuel cell; and a gas replacing process of, after the power generation of the fuel cell is stopped, activating the gas replacement apparatus at a predetermined timing to supply a replacement gas to the anode side of the fuel cell to replace the fuel gas on the anode side with the replacement gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
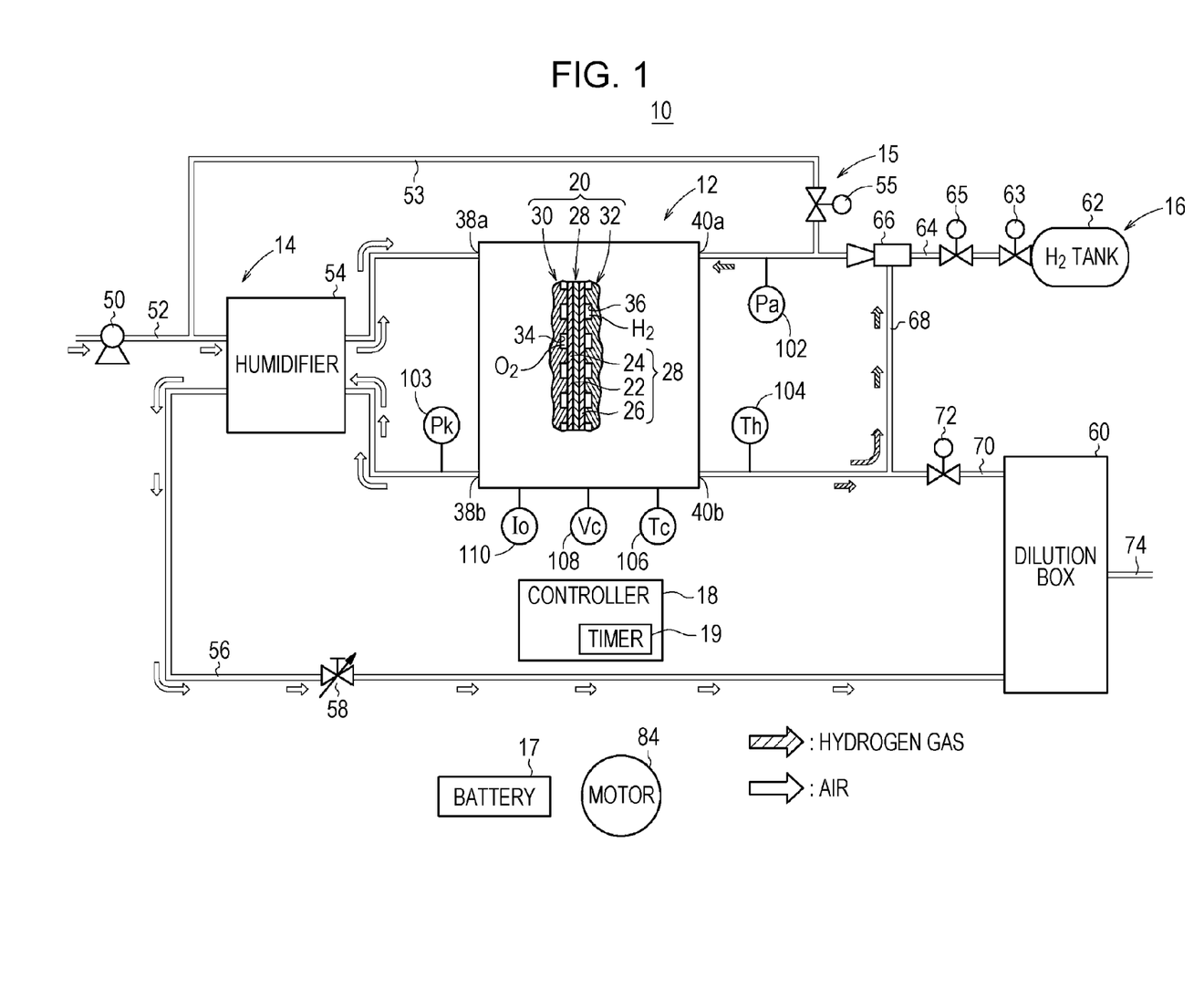
FIG. 1 is a schematic configurational diagram of a fuel cell system which is a target of an operation stopping method according to an exemplary embodiment of the disclosure.

As shown in FIG. 1, a fuel cell system 10 which is a target of an operation stopping method according to an exemplary embodiment of the disclosure includes a fuel cell stack 12, an oxide-gas supply apparatus 14 that supplies an oxide gas to the fuel cell stack 12, a gas replacement apparatus 15 that supplies a replacement gas to the fuel cell stack 12, a fuel-gas supply apparatus 16 that supplies a fuel gas to the fuel cell stack 12, a battery (electric storage device) 17 connectable to the fuel cell stack 12, and a controller (control apparatus, control unit) 18 that performs the general control of the fuel cell system 10.

The controller 18 is a computer including a microcomputer, and has a central processing unit (CPU), a read only memory (ROM including EEPROM) as a memory, a random access memory (RAM), input/output units, such as an A/D converter and a D/A converter, and a timer 19 serving as a clock or time-measuring unit. When the CPU reads a program stored in the ROM and executes it, the controller 18 functions as various functional parts, such as a control unit, an arithmetic operation unit, and a processing unit.

The fuel cell system 10 is mounted in a fuel cell vehicle like a fuel cell car. The battery 17 is used to normally run the fuel cell vehicle, and has a capacity of 20 A and as high as about 500V, a higher voltage and higher capacity than a 12-V power supply 98 to be described later.

The fuel cell stack 12 has a stack of a plurality of fuel cells (also called "cells" or "cell pairs") 20. Each fuel cell 20 includes an electrolyte membrane/electrode assembly (MEA) 28 which has a solid polymer electrolyte membrane 22 sandwiched between a cathode electrode 24 and a anode electrode 26. The solid polymer electrolyte membrane 22 is formed by a thin film of perfluorosulfone impregnated with water.

The cathode electrode 24 and the anode electrode 26 each have a gas diffusion layer formed by carbon paper or the like, and an electrode catalyst layer formed by applying porous carbon particles each carrying a platinum alloy (or Ru or the like) on its surface to the surface of the gas diffusion layer uniformly. The electrode catalyst layer is formed on both sides of the solid polymer electrolyte membrane 22.

The electrolyte membrane/electrode assembly 28 is sandwiched by a cathode-side separator 30 and an anode-side separator 32. The cathode-side separator 30 and anode-side separator 32 are made of, for example, carbon or a metal.

An oxide gas passage 34 is provided between the cathode-side separator 30 and the electrolyte membrane/electrode assembly 28. A fuel gas passage 36 is provided between the anode-side separator 32 and the electrolyte membrane/electrode assembly 28.

The fuel cell stack 12 is provided with an oxide-gas inlet hole 38a for supplying an oxide gas, e.g., an oxygen-containing gas (hereinafter also referred to as "air"), a fuel-gas inlet hole 40a for supplying a fuel gas, e.g., a hydrogen-containing gas (hereinafter also referred to as "hydrogen gas"), a coolant inlet hole (not shown) for supplying a coolant, an oxide-gas outlet hole 38b for discharging the oxide gas, a fuel-gas outlet hole 40b for discharging the fuel gas, and a coolant outlet hole (not shown) for discharging the coolant. The oxide-gas inlet hole 38a, the fuel-gas inlet hole 40a, the coolant inlet hole, the oxide-gas outlet hole 38b, the fuel-gas outlet hole 40b, and the coolant outlet hole communicate with one another in the stack direction of the fuel cells 20.

The oxide-gas supply apparatus 14 includes an air pump 50 that compresses atmospheric air and supplies it. The air pump 50 is disposed in an air supply passage 52. A humidifier 54 that exchanges moisture and heat between a supplied gas and an exhaust gas is disposed in the air supply passage 52. The air supply passage 52 communicates with the oxide-gas inlet hole 38a of the fuel cell stack 12.

The oxide-gas supply apparatus 14 further includes an air discharge passage 56 communicating with the oxide-gas outlet hole 38b. The air discharge passage 56 communicates with a humidifying-medium passage (not shown) of the humidifier 54. The air discharge passage 56 is provided with a back-pressure control valve (hereinafter also referred to simply as "back pressure valve") 58 whose degree of opening is adjustable, such as a butterfly valve, to adjust the pressure of air supplied to the fuel cell stack 12 from the air pump 50 via the air supply passage 52. The back-pressure control valve 58 is preferably a normally-closed control valve (which is closed when not energized). The air discharge passage 56 communicates with a dilution box 60.

The gas replacement apparatus 15 includes the air pump 50, which is shared with the oxide-gas supply apparatus 14, an air inlet passage 53 provided between a hydrogen supply passage 64 downstream of an ejector 66 and the air supply passage 52, and an air inlet valve 55 disposed in the air inlet passage 53.

The air inlet valve 55 is an on-off valve which is opened at the time of an anode-side air scavenging process or anode-side air replacing process in order to supply compressed air from the air pump 50 to the fuel gas passage 36 through the fuel-gas inlet hole 40a via the air supply passage 52 and the air inlet passage 53. The anode-side air scavenging process differs from the anode-side air replacing process in that the anode-side air scavenging process involves a large airflow rate enough to blow out water droplets, and is common to the anode-side air replacing process in that the fuel gas on the anode side is replaced with air.

The fuel-gas supply apparatus 16 includes a hydrogen tank 62 that stores high-pressure hydrogen and is integrally provided with an in-tank solenoid valve 63 which is an on-off valve. The hydrogen tank 62 communicates with the fuel-gas inlet hole 40a of the fuel cell stack 12 via the hydrogen supply passage 64.

The hydrogen supply passage 64 is provided with a shutoff valve 65 which is an on-off valve, and the ejector 66. The ejector 66 supplies the hydrogen gas supplied from the hydrogen tank 62 to the fuel cell stack 12 through the hydrogen supply passage 64, and sucks an exhaust gas containing an unused hydrogen gas, which has not been used in the fuel cell stack 12, from a hydrogen circulation path 68 and supplies the exhaust gas to the fuel cell stack 12 again as a fuel gas.

An off-gas passage 70 communicates with the fuel-gas outlet hole 40b. The hydrogen circulation path 68 communicates with a halfway portion of the off-gas passage 70, which is connected with the dilution box 60 via a purge valve 72. The outlet side of the dilution box 60 is connected with a discharge passage 74. The discharge passage 74 is provided with a storage buffer (not shown) to which an exhaust passage communicating with the atmosphere is connected.

The controller 18 acquires signals from a pressure sensor 102 provided in the hydrogen supply passage 64, a pressure sensor 103 provided in the vicinity of the oxide-gas outlet hole 38b, a temperature sensor 104 provided in the vicinity of the fuel-gas outlet hole 40b, a temperature sensor 106 provided in the coolant inlet hole (not shown), a voltage sensor 108, and a current sensor 110, and controls the ON (closing) and OFF (opening) actions of an FC contactor 86 to be described later, the opening/closing of and the degrees of opening of valves such as the shutoff valve 65, and controls an actuator for, for example, regulating the flow rate (airflow rate) of the air pump 50, based on the acquired signals. The pressure sensor 102 detects an anode pressure Pa. The pressure sensor 103 detects a cathode pressure Pk. The temperature sensor 104 detects a hydrogen temperature Th. The temperature sensor 106 detects a coolant temperature Tc. The voltage sensor 108 detects the voltage of each fuel cell 20 (termed "cell voltage" or "cell pair voltage"). The current sensor 110 detects a current value Io of the current flowing out from the fuel cell stack 12.

Figure 2:
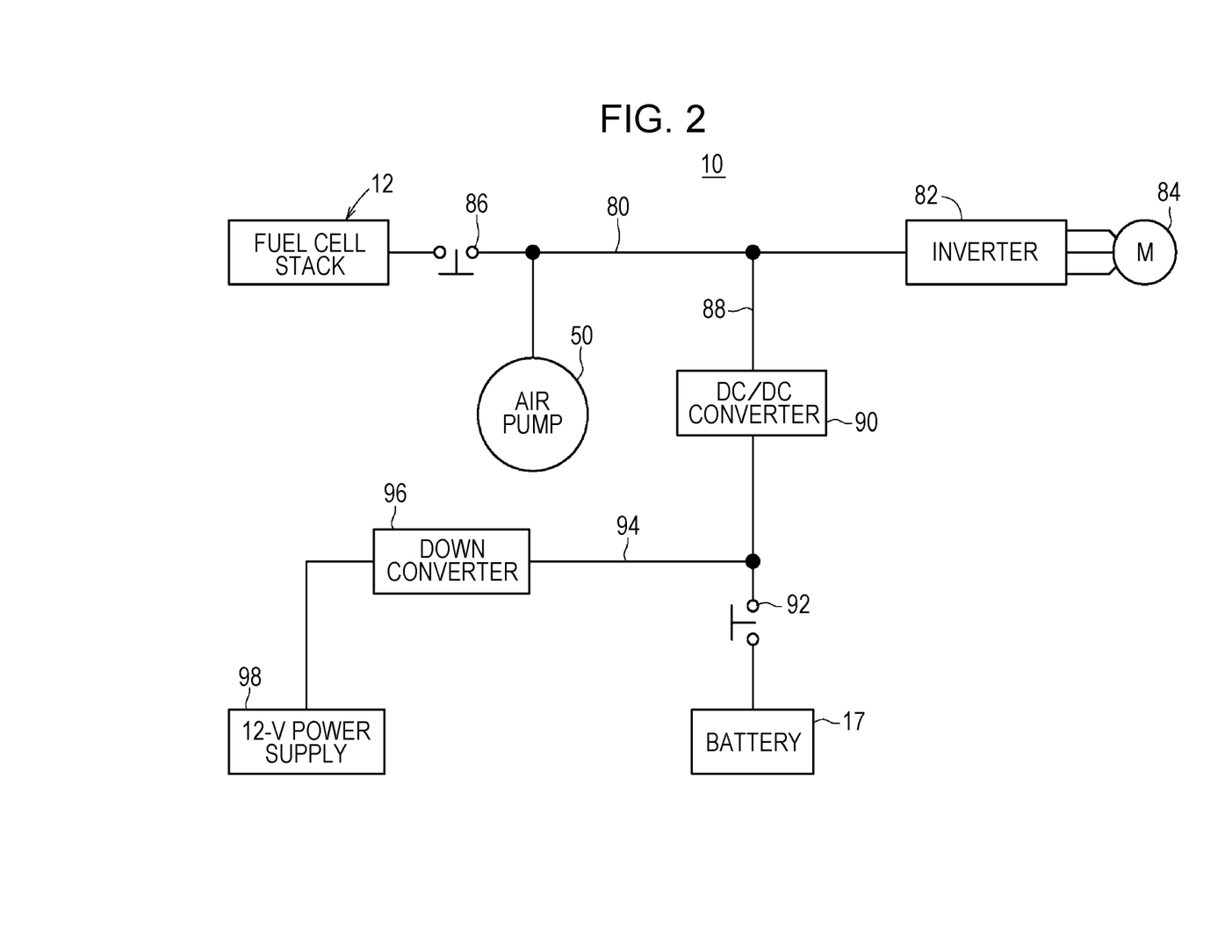
FIG. 2 is an explanatory diagram of circuits included in the fuel cell system.

As shown in FIG. 2, the fuel cell stack 12 is connected with one end of a main power line 80 whose other end is connected to an inverter 82. The inverter 82 is connected with a three-phase drive motor 84 for driving a vehicle. Substantially, two main power lines 80 are used, but are described as a single main power line 80 for the sake of descriptive convenience. The same is applied to other lines to be described hereinafter.

The main power line 80 is provided with the FC contactor (main-power-supply ON/OFF unit, fuel cell stack ON/OFF unit) 86, and is connected with the air pump 50. The main power line 80 is connected with one end of a power line 88 to which the battery 17 is connected via a DC/DC converter 90 and a battery contactor (electric-storage-unit ON/OFF unit) 92. The power line 88 is provided with a branched power line 94 to which the 12-V power supply 98 is connected via a down converter (DC/DC converter) 96. The voltage of the 12-V power supply 98 is not limited to 12 V and may be other values lower than the voltage of the battery 17.

The operation of the fuel cell system 10 with the foregoing configuration will be described below.

First, at the time of the normal operation of the fuel cell system 10 (also referred to as "at the time of normal power generation" or "at the time of a normal power generating process"), air is supplied to the air supply passage 52 via the air pump 50 included in the oxide-gas supply apparatus 14. The air is humidified through the humidifier 54, and is supplied to the oxide-gas inlet hole 38a of the fuel cell stack 12. The air moves along the oxide gas passage 34, provided in each fuel cell 20 in the fuel cell stack 12, to be supplied to the cathode electrode 24.

The used air is discharged into the air discharge passage 56 from the oxide-gas outlet hole 38b, and is supplied to the humidifier 54 to humidify air newly supplied. The air is then supplied to the dilution box 60 via the back pressure valve 58.

When the in-tank solenoid valve 63 and the shutoff valve 65 in the fuel-gas supply apparatus 16 are opened, the hydrogen gas from the hydrogen tank 62 is depressurized by a depressurization control valve (not shown), and is then supplied to the hydrogen supply passage 64. The hydrogen gas is supplied to the fuel-gas inlet hole 40a of the fuel cell stack 12 through the hydrogen supply passage 64. The hydrogen gas supplied into the fuel cell stack 12 moves along the fuel gas passage 36 of each fuel cell 20 to be supplied to the anode electrode 26.

The used hydrogen gas is sucked by the ejector 66 from the fuel-gas outlet hole 40b via the hydrogen circulation path 68, and is supplied to the fuel cell stack 12 again as a fuel gas. Therefore, the air supplied to the cathode electrode 24 electrochemically reacts with the hydrogen gas supplied to the anode electrode 26 to generate power.

Impurities are likely to be mixed in the hydrogen gas that circulates in the hydrogen circulation path 68. Accordingly, the impurity-containing hydrogen gas is supplied to the dilution box 60 via the purge valve 72 opened. This hydrogen gas is mixed with an air-off gas in the dilution box 60 to reduce the hydrogen concentration, and is then discharged into the storage buffer (not shown).

During normal power generation, the gas replacement apparatus 15 is not activated, and the air inlet valve 55 is kept closed. The air inlet valve 55 is preferably a normally closed on-off valve (which is closed when not energized).

Next, the operation stopping method for the fuel cell system 10 will be described below referring to a timing chart illustrated in FIG. 3.

The fuel cell system 10 mounted in a fuel cell vehicle (not shown) executes the normal power generation in the foregoing manner, and the vehicle runs desirably. When an unillustrated ignition switch (operation switch) is set off, the controller 18 detects the turn-off action as a stop instruction (time t1), and initiates the operation stopping process for the fuel cell system 10.

Figure 4:
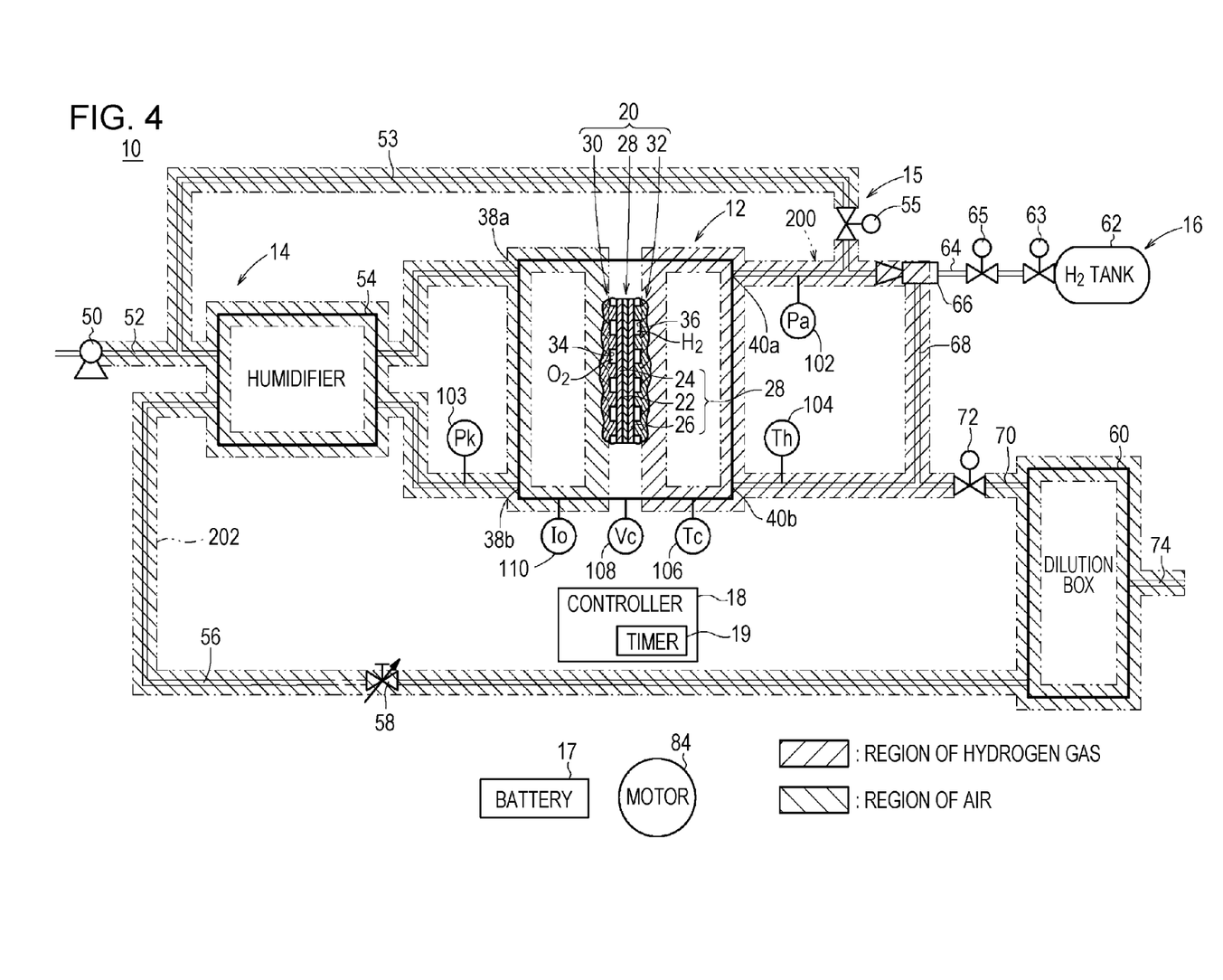
FIG. 4 is an explanatory diagram of a hydrogen-gas volume part and an air volume part in the fuel cell system.

First, after a discharge process (also referred to as "low-oxygen stoichiometric power generating process", "in-stop-mode power generating process", "$O_2$ lean process" or "$O_2$ lean power generating process") to be described later, the supply pressure of the hydrogen gas (fuel gas) is set beforehand so that the fuel-gas pressure (anode pressure Pa) in the fuel cell stack 12 is kept at a set pressure. Specifically, as shown in FIG. 4, a hydrogen-gas volume part 200 which is closed after being filled with the hydrogen gas includes the fuel gas passages 36, the fuel-gas inlet hole 40a and the fuel-gas outlet hole 40b in the fuel cell stack 12, a downstream region downstream of the ejector 66 in the hydrogen supply passage 64, the hydrogen circulation path 68, an upstream region upstream of the purge valve 72 in the off-gas passage 70.

An air volume part 202 which replaces an air atmosphere with a nitrogen atmosphere or an inactive gas includes the oxide gas passages 34, the oxide-gas inlet hole 38a and the oxide-gas outlet hole 38b in the fuel cell stack 12, the air supply passage 52, the air discharge passage 56, the humidifier 54, the dilution box 60 and the storage buffer (not shown).

At the time of the discharge process, air is supplied with an oxygen stoichiometric ratio lower than the oxygen stoichiometric ratio in normal power generation mode. Specifically, the low oxygen stoichiometric ratio is set around a value of 1. It is preferable that the oxygen stoichiometric ratio should fall between 1.2 to 1.8 in normal power generation mode. The supply of the hydrogen gas is stopped at the time of the discharge process.

Accordingly, $nO_2$ or the number of moles of the remaining oxygen in the air volume part 202 which are to be set to a nitrogen atmosphere in the fuel cell stack 12, $n'O_2$ or the number of moles of the oxygen in the humidifier 54, the dilution box 60 and the storage buffer which are to be set to a nitrogen atmosphere by the low oxygen stoichiometric ratio provided by the air pump 50, and $nH_2$ or the number of moles of the remaining hydrogen in the hydrogen-gas volume part 200 are set to have a relation of $2(nO_2+n'O_2)=nH_2$.

Figure 3:
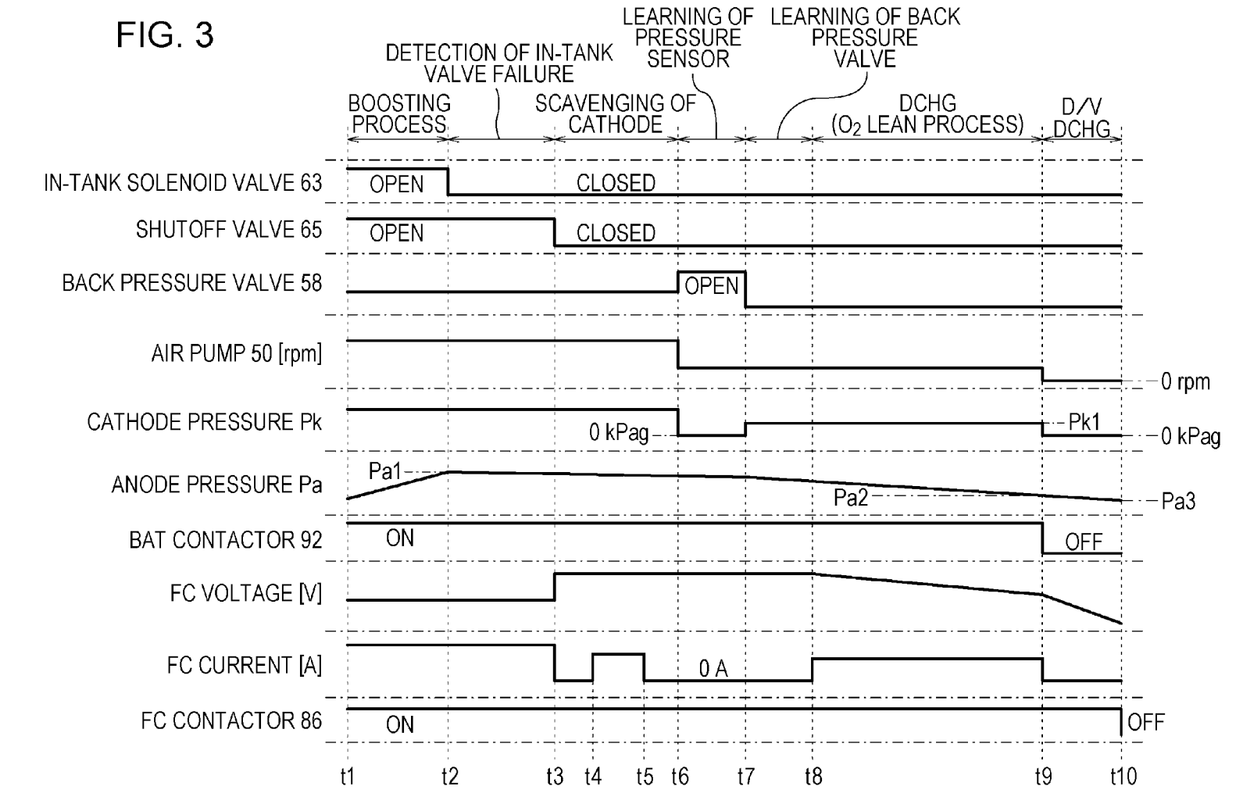
FIG. 3 is a timing chart illustrating the operation stopping method.

The supply pressure (anode pressure), Pa1, of the hydrogen gas is calculated from the set number of moles of the remaining hydrogen $nH_2$ using an equation of $n=P\times V/R\times T$ where n represents the number of moles, P represents the pressure, V represents the volume, R represents a gas constant, and T represents the absolute temperature (see FIG. 3). Note that the anode pressure Pa1 is set so as to be kept equal to or higher than a constant pressure Pa2 when the discharge process is completed. The constant pressure Pa2 is low enough to prevent hydrogen from running short or being present excessively.

When a relation that the volume of the air volume part 202 is much greater than the volume of the hydrogen-gas volume part 200 holds true, it is possible to employ a method of increasing the pressure of hydrogen gas to the anode pressure Pa1, or a method of supplying hydrogen gas for the deficit hydrogen in order to increase the volume of the hydrogen-gas volume part 200.

When a relation that the volume of the hydrogen-gas volume part 200 is much greater than the volume of the air volume part 202 holds true, on the other hand, a method of reducing the pressure to the anode pressure Pa1 is employed to decrease the volume of the hydrogen-gas volume part 200.

When the ignition switch (operation switch) is set off (time t1), as shown in FIG. 3, the hydrogen gas is supplied to the fuel cell stack 12 with the in-tank solenoid valve 63 and the shutoff valve 65 being opened, so that the pressure in the fuel cell stack 12 rises to the anode pressure Pa1 (times t1 to t2: boosting process). This anode pressure Pa1 is calculated by the aforementioned equation.

When the boosting process is terminated (time t2), the in-tank solenoid valve 63 is closed, and the processing shifts to a process of detecting a failure of the in-tank solenoid valve 63. In the failure detecting process, a failure in the in-tank solenoid valve 63 is detected according to the present/absence of a change in pressure directly below the in-tank solenoid valve 63. When the pressure drops, the in-tank solenoid valve 63 is regarded as normal. That is, it is determined that the in-tank solenoid valve 63 is closed properly.

When the failure detecting process for the in-tank solenoid valve 63 is terminated (time t3), a cathode scavenging process is executed. In the cathode scavenging process, a scavenging process based on air (using the oxide-gas supply apparatus 14) is performed to blow off liquid droplets or the like containing water droplets on the cathode side. In this process, power insufficient to drive the air pump 50 which is set to have a high number of rotations [rpm] is supplemented (times t4 to t5).

After the cathode scavenging process, control on the degree of opening of the back pressure valve 58 is temporarily stopped, and the back pressure valve 58 is opened to communicate with the atmosphere, so that the cathode pressure Pk is set to PK=0 [kPag] where g means the gauge pressure (times t6 to t7). Further, when the cathode scavenging process is terminated (time t6), the number of rotations of the air pump 50 included in the oxide-gas supply apparatus 14 is reduced considerably as compared with that in normal operation mode, so that the oxide gas is supplied to with the oxygen stoichiometric ratio being lower than the oxygen stoichiometric ratio in normal operation mode. Specifically, the oxygen stoichiometric ratio is preferably set around 1. Then, a learning process (compensation for 0 point) for the pressure sensor 103 is executed.

Thereafter, the degree of opening of the back pressure valve 58 is adjusted at times t7 to t8 to set the cathode pressure Pk detected by the pressure sensor 103 to a predetermined low pressure Pk1 corresponding to the low oxygen stoichiometric ratio, and a learning process for the back pressure valve 58 at the low pressure Pk1 is executed (times t7 to t8). Thereafter, the cathode pressure Pk is kept set at the low pressure Pk1 until the air pump 50 is turned off (time t9).

Meanwhile, the fuel cell stack 12 keeps generating power (times t1 to t8).

In the low-oxygen stoichiometric power generating process (also referred to as "$O_2$ lean power generating process" or simply as "$O_2$ lean process"; times t8 to t9) after the learning process for the back pressure valve 58 (times t7 to t8), the current (FC current) to be acquired from the fuel cell stack 12 is set to a value which inhibits the hydrogen gas as the fuel gas from passing through the solid polymer electrolyte membrane 22 to move toward the cathode from the anode. At this time, the FC contactor 86 and the battery contactor 92 are set on in FIG. 2, and power obtained when the fuel cell stack 12 generates power is reduced by the DC/DC converter 90 to be charged in the battery 17 with a dropped voltage.

As described above, while air with a low oxygen stoichiometric ratio is supplied to the fuel cell stack 12, the fuel cell stack 12 is generating power with supply of the hydrogen gas being stopped by the closure of the shutoff valve 65 (time t3). The purge valve 72 is also closed. The power generated by the fuel cell stack 12 is supplied to the battery 17 to be discharged (DCHG ($O_2$ lean process) in FIG. 3). When the power generated by the fuel cell stack 12 drops to a predetermined voltage, i.e., to a voltage which cannot be supplied to the battery 17 (substantially the same voltage as the voltage of the battery 17), the generated power is supplied only to the air pump 50.

Accordingly, while the hydrogen concentration on the anode side in the fuel cell stack 12 during the $O_2$ lean process (times t8 to t9), the oxygen concentration on the cathode side drops. Therefore, when the hydrogen pressure (anode pressure Pa) becomes equal to or lower than the predetermined pressure Pa2, for example, the air pump 50 is turned off, and the battery contactor 92 is set off (time t9).

Accordingly, the fuel cell stack 12 generates power according to the reaction of the hydrogen gas and air present inside the fuel cell stack 12 with each other (times t9 to t10). The power that is generated by the power generation of the fuel cell stack 12 is reduced via the down converter 96 to be charged in the 12-V power supply 98 (D/V DCHG in FIG. 3), and the power is supplied to a radiator fan or the like (not shown) as needed. Further, when the voltage generated by the fuel cell stack 12 drops down to near the operational limit voltage of the down converter 96, the FC contactor 86 is set off (time t10). As a result, the fuel cell system 10 goes to an operation stopped state or a "soaked state".

As described above, when the ignition switch is set off (time t1), the anode pressure Pa in the fuel cell stack 12 rises to the anode pressure Pa1 before supply of the hydrogen gas is stopped (time t2), and then the back pressure valve 58, the air pump 50, the in-tank solenoid valve 63 and the shutoff valve 65 are actuated. Therefore, the fuel cell stack 12 generates power according to the reaction of the hydrogen gas and air with a low-oxygen stoichiometric ratio, which remain inside the fuel cell stack 12, with each other, and the generated power is supplied to the battery 17 to be discharged (times t2 to t9).

Accordingly, the hydrogen concentration decreases on the anode side in the fuel cell stack 12, and the oxygen concentration decreases on the cathode side, thereby increasing the nitrogen concentration. As a result, a nitrogen gas with a high concentration is produced as an exhaust gas on the cathode side, and the nitrogen gas is supplied to the dilution box 60.

Therefore, the air volume part 202 including the fuel cell stack 12 shown in FIG. 4 can be filled with the nitrogen gas which is an inactive gas.

In addition, the supply pressure of the hydrogen gas to be supplied to the fuel cell stack 12 is increased to the anode pressure Pa1 (time t2) before supply of the hydrogen gas is stopped. This can bring about an effect that low-oxygen stoichiometric power generation ($O_2$ lean process) is carried out properly with the fuel cell stack 12 being filled with an adequate amount of hydrogen, preventing an excessive hydrogen gas from remaining inside the fuel cell stack 12 or a hydrogen gas in the fuel cell stack 12 from running short, after discharging is completed.

Further, with the air pump 50 being stopped (time t9), the fuel cell stack 12 is caused to generate power according to a reaction of only hydrogen and oxygen remaining in the fuel cell stack 12 with each other (D/V DCHG in FIG. 3).

Therefore, the nitrogen-gas replacement range in the system is limited within the fuel cell stack 12 when the power generation of the fuel cell stack 12 is carried out while supplying air via the air pump 50, whereas the nitrogen-gas replacement range is expanded to the inlet side of the fuel cell stack 12 when the power generation of the fuel cell stack 12 is carried out after the air pump 50 is stopped. This brings about an advantage that even when the fuel cell system 10 is stopped for a comparatively long period of time, deterioration of the fuel cells 20 on the cathode side can be prevented as much as possible.

There is a case where the concentration of the hydrogen gas on the anode side has not dropped so much at the time (t10) when the FC contactor 86 is set off to stop the power generation of the fuel cells 20.

Figure 5:
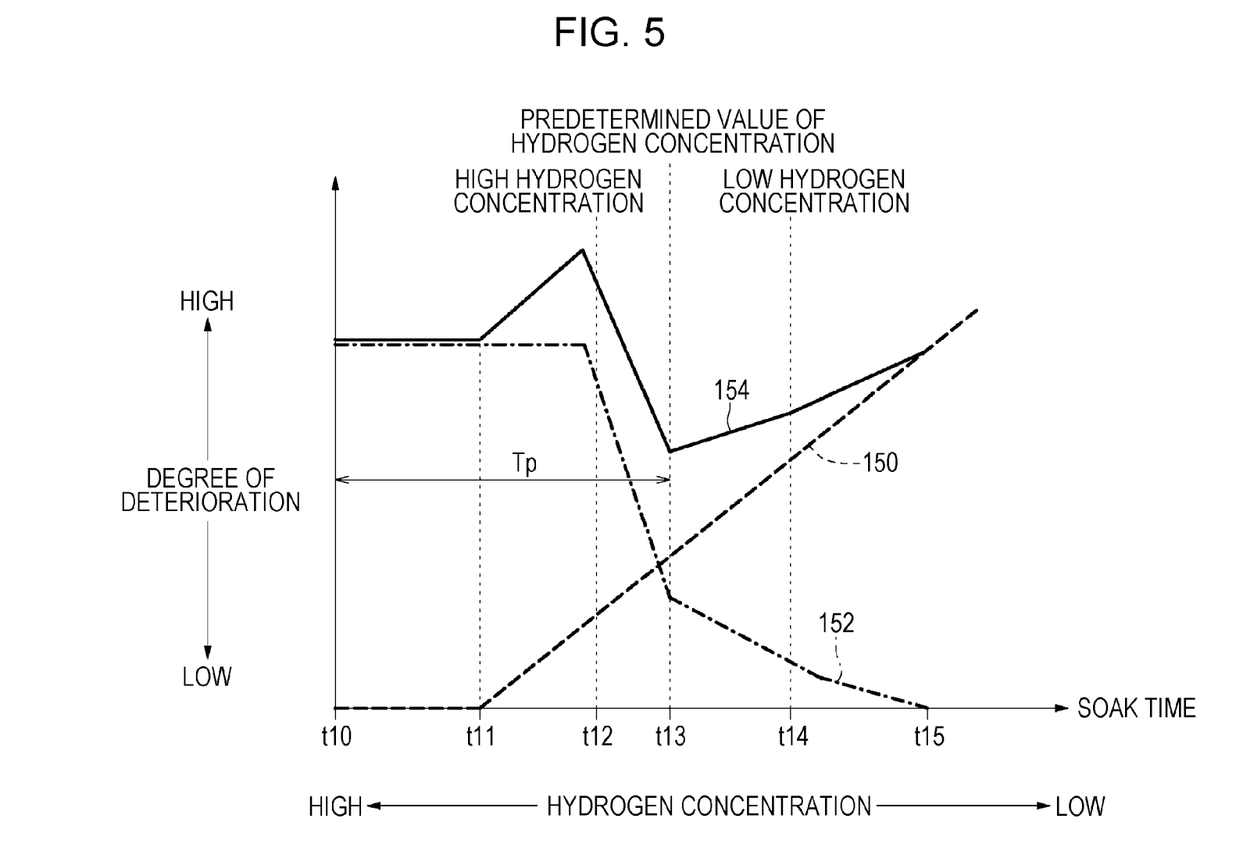
FIG. 5 is an explanatory diagram of the degree of deterioration v.s. a soak time with a hydrogen concentration used as a parameter.

During soaking starting at the time t10 when the FC contactor 86 is set off (when power generation of the fuel cell system 10 (fuel cells 20) is stopped), therefore, the deterioration of the electrolyte membrane/electrode assembly 28 increases in proportion to time, as shown by a deterioration characteristic 150 indicated by a dashed line in FIG. 5, from a time t11 or a predetermined time after the time t10 when soaking has started, due to generation of radicals (OH radicals) or the like which is originated from the cell voltage during soaking being held near the OCV.

Suppressing the deterioration needs a gas replacing process to replace the hydrogen gas in the anode with air by opening the air inlet valve 55 included in the gas replacement apparatus 15, and driving the air pump 50 for a given time to intermittently open the purge valve 72 at or after the soak starting time t10 when the FC contactor 86 is set off.

In this gas replacing process, however, the deterioration of the electrolyte membrane/electrode assembly 28 changes according to the level of the hydrogen concentration at the time of the initiation of the gas replacing process, as shown by a deterioration characteristic 152 indicated by a dashed-dotted line in FIG. 5. That is, the deterioration characteristic shows that the higher the hydrogen concentration, the greater the amount of deterioration of the electrolyte membrane/electrode assembly (the amount of reduction of the power generating efficiency of the fuel cell stack 12).

A deterioration characteristic 154 indicated by a solid line which is the combination (sum) of the deterioration characteristic 150 and the deterioration characteristic 152 shows that the amount of deterioration of the electrolyte membrane/electrode assembly 28 is minimized when the hydrogen concentration of the anode has a predetermined value (at a timing of the soak time=t13−t10=Tp).

It is therefore possible to minimize the degree of deterioration of the electrolyte membrane/electrode assembly 28 by executing the gas replacing process to replace the hydrogen gas in the anode with air by opening the air inlet valve 55, and driving the air pump 50 for a given time after a predetermined time (predetermined timing) Tp elapses from the soak starting time t10 when the FC contactor 86 is set off.

Figure 6:
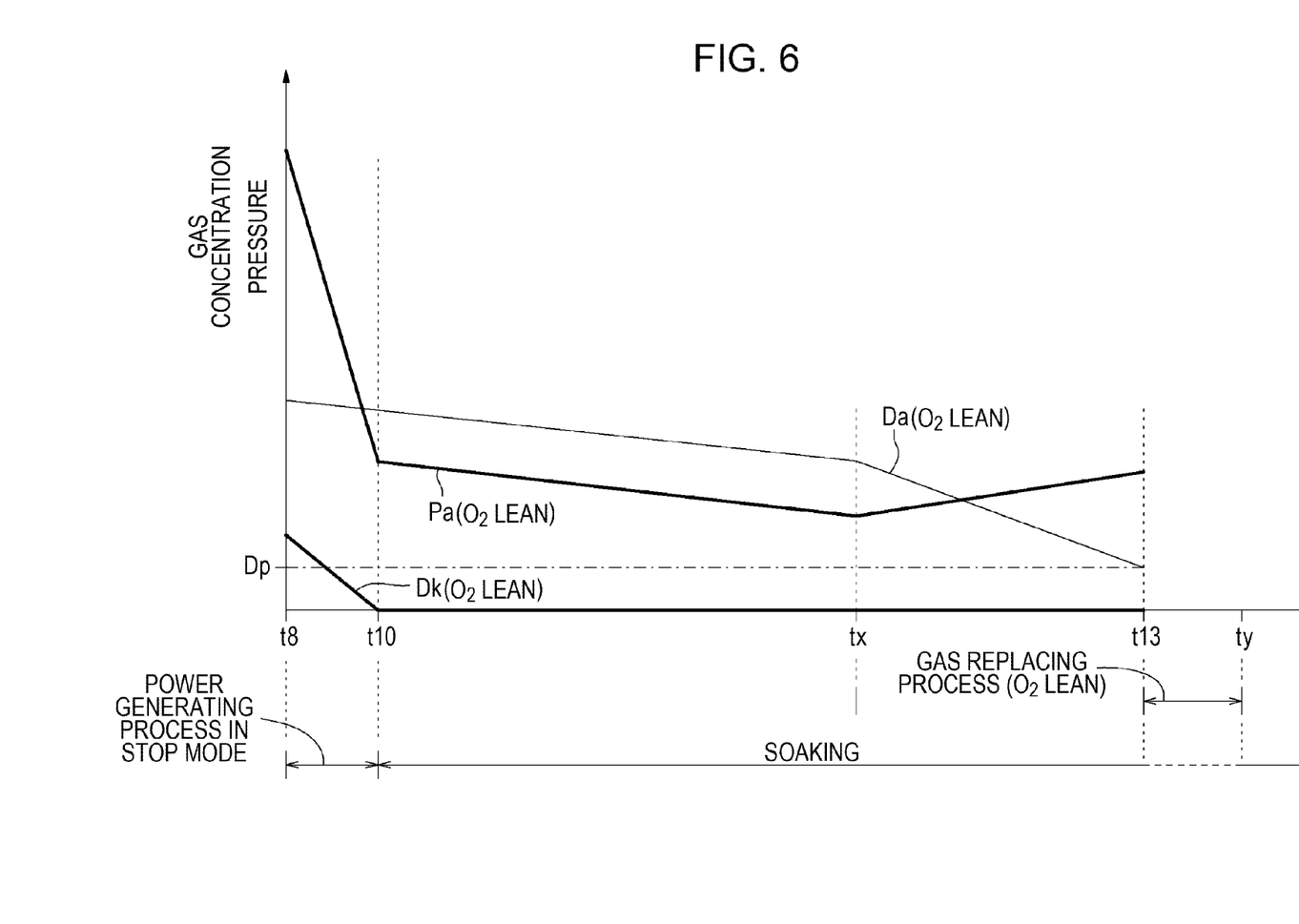
FIG. 6 is an explanatory diagram of the timing for a gas replacing process when a low-oxygen stoichiometric power generating process ($O_2$ lean power generation) is executed.

FIG. 6 shows the characteristics of changes in the gas concentrations (hydrogen gas concentration and oxygen gas concentration) and the gas pressure (anode pressure) when the low-oxygen stoichiometric power generating process ($O_2$ lean power generating process) which is the in-stop-mode power generating process is executed (times t8 to t10 (t9)).

A cathode oxygen concentration characteristic Dk ($O_2$ lean) indicated by a thick solid line shows that the oxygen concentration of the cathode decreases during the in-stop-mode power generating process (times t8 to t10), and stays low during soaking (at or after the soak starting time t10).

During the in-stop-mode power generating process (times t8 to t10), an anode hydrogen concentration characteristic Da ($O_2$ lean) gradually decrease because hydrogen is consumed in power generation, while the anode pressure Pa abruptly drops as indicated by an anode pressure characteristic Pa ($O_2$ lean).

During soaking (at or after the soak starting time t10), on the other hand, hydrogen is not consumed so that the anode pressure Pa gradually drops as indicated by the anode pressure characteristic Pa ($O_2$ lean), but when the amount of hydrogen becomes small (time tx), the amount of the nitrogen gas permeating from the cathode side toward the anode becomes large, so that the anode pressure Pa gradually increases (times tx to t13).

When the anode hydrogen concentration drops with an increase in anode pressure Pa, and becomes a threshold concentration Dp (e.g., value of 0 to 2% or so) (time t13) as indicated by the anode hydrogen concentration characteristic Da ($O_2$ lean), the foregoing gas replacing process is initiated (time t13), and is carried out for a predetermined time (times t13 to ty).

Figure 7:
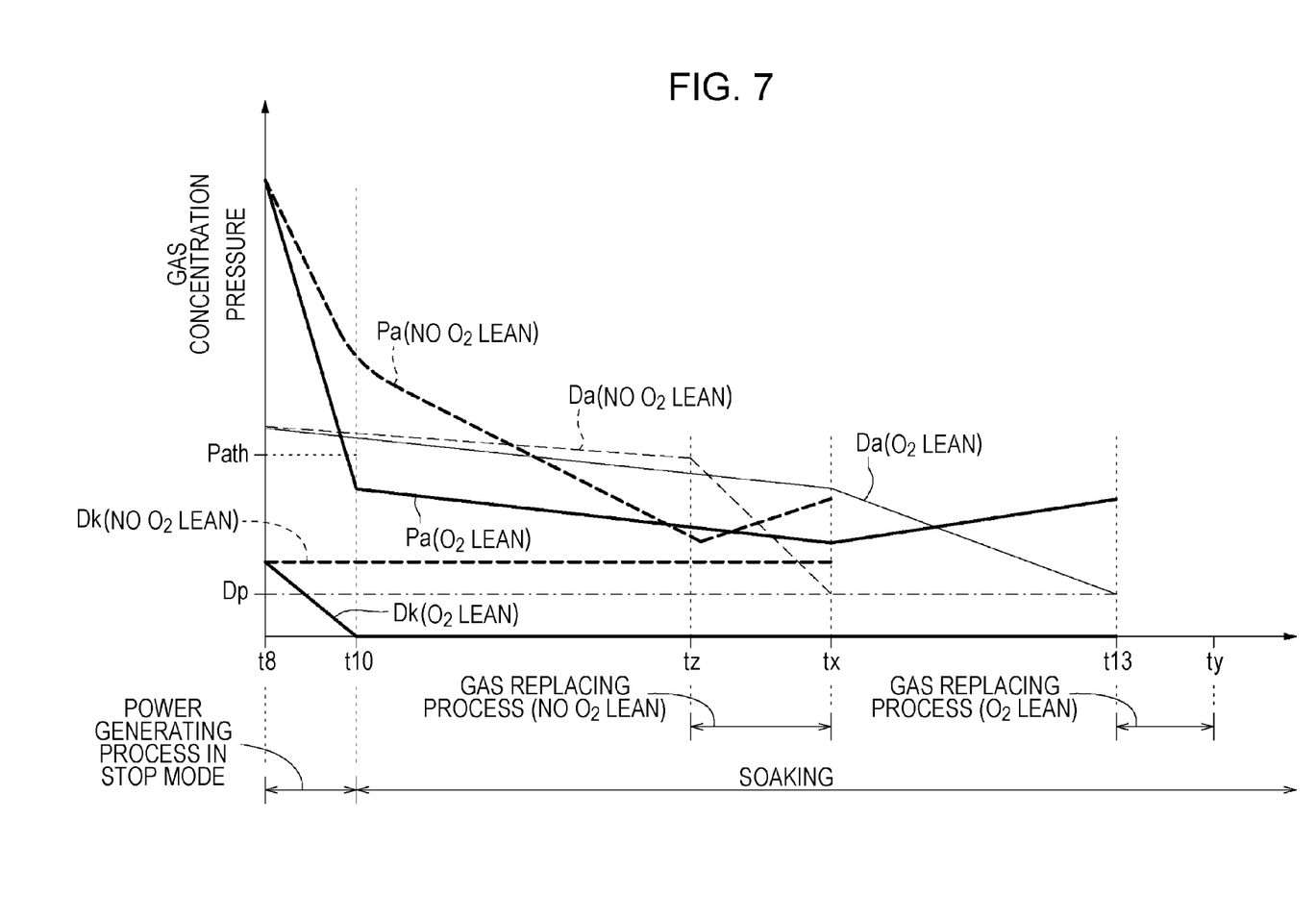
FIG. 7 is an explanatory diagram of the timing for the gas replacing process when the low-oxygen stoichiometric power generating process ($O_2$ lean power generation) is executed in comparison with the timing for the gas replacing process when the low-oxygen stoichiometric power generating process is not executed.

When the in-stop-mode power generating process ($O_2$ lean power generating process) is not executed (when the FC contactor 86 is set off at the ignition-off time (time t1)), the cathode oxygen concentration is high during soaking (at or after the soak starting time t10), so that if hydrogen permeates from the anode to the cathode, the hydrogen is consumed out, and the hydrogen partial pressure difference is not reduced, but the reduction in anode pressure Pa (hydrogen pressure) is accelerated, as indicated by the cathode oxygen concentration characteristic Dk (without $O_2$ lean), anode pressure characteristic Pa (without $O_2$ lean) and anode hydrogen concentration characteristic Da (without $O_2$ lean) in FIG. 7. When the amount of hydrogen becomes small (time tz), the amount of oxygen permeation to the anode increases, raising the anode pressure and dropping the hydrogen concentration. When the amount of hydrogen becomes the threshold concentration Dp (time tx), the gas replacing process (without $O_2$ lean) is initiated.

Therefore, if the anode pressure Pa detected (measured) at the time (time t10) when a predetermined time (t10−t8) elapses from the time t8 when the ignition switch has been turned off is lower than a threshold pressure Path (see FIG. 7), it is possible to determine that the low-oxygen stoichiometric power generation ($O_2$ lean power generation) has been executed.

Note that the threshold pressure Path takes a value which has been confirmed beforehand through simulation and experiments or the like such that the anode pressure Pa is lower than the threshold pressure Path when the low-oxygen stoichiometric power generation ($O_2$ lean power generation) is executed, but the anode pressure Pa does not get lower than the threshold pressure Path when the low-oxygen stoichiometric power generation ($O_2$ lean power generation) is not executed.

SUMMARY OF THE EMBODIMENT

As described above, the foregoing embodiment provides a method of stopping the operation of the fuel cell system 10 including the fuel cells 20 and the gas replacement apparatus 15. The fuel cells 20 each generate power according to an electrochemical reaction of an oxide gas supplied to the cathode side of the electrolyte membrane/electrode assembly 28 by the oxide-gas supply apparatus 14 with a fuel gas supplied to the anode side of the electrolyte membrane/electrode assembly 28 by the fuel-gas supply apparatus 16. The gas replacement apparatus 15 supplies a replacement gas to the anode side of the fuel cells 20 to replace the fuel gas on the anode side with the replacement gas. The method includes a normal power generating process, an in-stop-mode power generating process (times t8 to t9, t10), and a gas replacing process (times t13 to ty). The normal power generating process is a process of causing the fuel cells 20 to generate power while supplying the oxide gas and the fuel gas to the fuel cells 20. The in-stop-mode power generating process (times t8 to t9, t10) is a process of, upon detection of an instruction to stop the operation of the fuel cells 20 (time t1), stopping supply of the fuel gas, and supplying the oxide gas with an oxygen stoichiometric ratio lower than the oxygen stoichiometric ratio in normal power generation to the fuel cells 20 to generate power therefrom, and then stopping power generation. The gas replacing process (times t13 to ty) is a process of, after the power generation is stopped (time 10), activating the gas replacement apparatus 15 at a timing (time t13; see FIGS. 5 and 6) predetermined in consideration of the amount of deterioration of the electrolyte membrane/electrode assembly 28 to supply a replacement gas to the anode side of the fuel cells 20 to replace the fuel gas on the anode side with the replacement gas.

According to the operation stopping method, power generation is carried out by supplying the oxide gas to the fuel cells 20 with the supply of the fuel gas being stopped, so that the hydrogen concentration in the fuel gas in the fuel cells 20 on the anode side drops. As a result, hydrogen does not pass through the solid polymer electrolyte membrane 22 toward the cathode side from the anode side, preventing a reaction of hydrogen with oxygen on the cathode side. Further, gas replacement is carried out at a predetermined timing after power generation is stopped, which suppresses deterioration of the fuel cells 20. In addition, a tank to store a gas is not necessary.

Therefore, the fuel cell system even with a simplified and compact configuration can effectively suppress deterioration of the electrolyte membrane/electrode assembly 28.

According to the operation stopping method, the predetermined timing is determined based on the amount of deterioration of the electrolyte membrane/electrode assembly 28 which is deteriorated by a reaction of the fuel gas remaining in the anode with the supplied replacement gas when the gas replacing process is executed at or after the point (t10) of stopping the power generation (the amount of deterioration indicated by the deterioration characteristic 154), and the amount of deterioration of the electrolyte membrane/electrode assembly 28 which is deteriorated in a soaked state at or after the point of stopping the power generation (the amount of deterioration indicated by the deterioration characteristic 150). Therefore, the predetermined timing can be set to the timing (t13) at which the sum of both amounts of deterioration is minimized, thus making it possible to maximize suppression of the deterioration of the electrolyte membrane/electrode assembly 28.

Further, according to the operation stopping method, the predetermined timing may be set to the timing when the concentration of the fuel gas on the anode side of the fuel cells 20 becomes equal to or lower than the threshold concentration Dp (see FIG. 6), thus making it possible to suppress the amount of deterioration of the electrolyte membrane/electrode assembly 28 at the time of executing the gas replacing process. The amount of deterioration of the electrolyte membrane/electrode assembly 28 caused by gas replacement and the amount of deterioration of the electrolyte membrane/electrode assembly 28 caused by radicals during soaking both depend on the concentration of the fuel gas in the anode. Therefore, each amount of deterioration of the electrolyte membrane/electrode assembly can be suppressed to the minimum by executing the gas replacing process when the concentration of the fuel gas becomes equal to or lower than the threshold concentration Dp.

Furthermore, according to the operation stopping method, whether the in-stop-mode power generating process is executed is preferably determined based on the anode pressure Pa when power generation of the fuel cell is stopped. In this case, a phenomenon is used that the anode pressure Pa is decreased by execution of the in-stop-mode power generating process. Because the pressure sensor 102 is normally mounted in the fuel cell system 10, the use of the phenomenon does not raise the cost.

Moreover, according to the operation stopping method, whether the in-stop-mode power generating process is executed is preferably determined based on an accumulated current value from the point of detecting the instruction to stop the operation of the fuel cell 20 to the point of stopping power generation (accumulated current value from time t8 to time t9 (the duration may be from time t8 to time t10 in FIG. 3). In this case, a phenomenon is used that the accumulated current value within a predetermined time (from time t8 to time t10) is increased by execution of the in-stop-mode power generating process. Because the current sensor 110 normally detects a current value Io in the fuel cell system 10, pressure sensor 102 is normally mounted in the fuel cell system 10, and the use of the phenomenon does not raise the cost for calculating an accumulated current value $\Sigma$Io of the current value Io.

Figure 8:
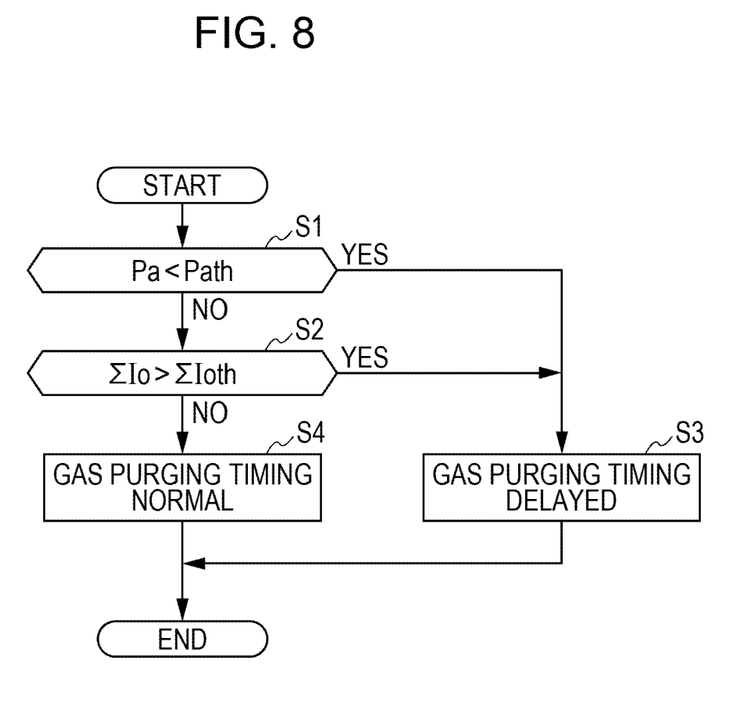
FIG. 8 is a flowchart used to determine whether the low-oxygen stoichiometric power generating process ($O_2$ lean power generation) is executed.

As illustrated in a flowchart in FIG. 8, whether low-oxygen stoichiometric power generation ($O_2$ lean power generation) is executed during the process of stopping the fuel cell system 10 is determined based on the anode pressure Pa (step S1: Pa<Path) at a predetermined time (time t10) and the accumulated current value $\Sigma$Io (step S2: $\Sigma$Io>$\Sigma$Ioth) in a predetermined period of time (times t8 to t10). When the low-oxygen stoichiometric power generation ($O_2$ lean power generation) is executed, the anode-gas replacing process is executed at a timing (step S3: time tz in FIG. 7 changed to time t13) later than the normal timing (step S4) to thereby suppress deterioration of the electrolyte membrane/electrode assembly 28.

When the ignition switch is set on after execution of the gas replacing process on the anode side, hydrogen is supplied to the anode side where air remains, and reacts with oxygen in the anode, causing deterioration of the electrolyte membrane/electrode assembly 28. If the gas replacing process on the anode side is executed at a timing later than the normal timing as described according to the embodiment, it is more likely that, when the ignition switch is set on immediately after it is set off, i.e., in the case of activation in a short time after the operation is stopped, the ignition switch of the fuel cell system 10 is set on before the gas replacing process, so that deterioration of the electrolyte membrane/electrode assembly 28 does not occur. In other words, the probability of causing deterioration of the electrolyte membrane/electrode assembly 28 in activation in a short time after the operation is stopped can be reduced by executing the gas replacing process on the anode side at a timing later than the normal timing.

When the decision in step S1 or step S2 is satisfied, the state of the low-oxygen stoichiometric power generation ($O_2$ lean power generation) being executed is determined. Interruption in the low-oxygen stoichiometric power generation ($O_2$ lean power generation) in which those decisions are not satisfied is not determined to be the low-oxygen stoichiometric power generation being executed. Practically, it is determined from the time at which the ignition switch is set off (time t1) whether low-oxygen stoichiometric power generation ($O_2$ lean power generation) should be executed, or low-oxygen stoichiometric power generation ($O_2$ lean power generation) should be interrupted before being completed.

The disclosure is not limited to the foregoing embodiment, and may take various configurations based on the contents of the present specification.

According to the embodiments, there is provided a method of stopping an operation of a fuel cell system having a fuel cell that generates power according to an electrochemical reaction of an oxide gas supplied to a cathode side of an electrolyte membrane/electrode assembly with a fuel gas supplied to an anode side of the electrolyte membrane/electrode assembly, an oxide-gas supply apparatus that supplies the oxide gas to the fuel cell, a fuel-gas supply apparatus that supplies the fuel gas to the fuel cell, and a gas replacement apparatus that supplies a replacement gas to the anode side of the fuel cell to replace the fuel gas on the anode side with the replacement gas.

The method includes an in-stop-mode power generating process of, upon detection of an instruction to stop an operation of the fuel cell, stopping supply of the fuel gas, and supplying the oxide gas to the fuel cell to generate power therefrom, and then stopping power generation, and a gas replacing process of, after the power generation is stopped, activating the gas replacement apparatus at a predetermined timing to supply a replacement gas to the anode side of the fuel cell to replace the fuel gas on the anode side with the replacement gas.

In the above method, the predetermined timing may be determined based on an amount of deterioration of the electrolyte membrane/electrode assembly when the gas replacing process is executed at or after a timing at which the power generation is stopped, and an amount of deterioration of the electrolyte membrane/electrode assembly in a soaked state at or after the timing at which the power generation is stopped.

With the method according to the embodiments, power generation is carried out by supplying the oxide gas to the fuel cell with the supply of the fuel gas being stopped, thus lowering the hydrogen concentration in the fuel gas on the anode side in the fuel cell. Further, the oxygen concentration on the cathode side drops. As a result, hydrogen does not pass through the electrolyte membrane toward the cathode side from the anode side, preventing a reaction of hydrogen with oxygen on the cathode side. It is therefore possible to suppress deterioration of the electrolyte membrane/electrode assembly adequately.

Since the oxygen concentration on the cathode side is low after power generation is stopped, the amount of oxygen transmitted to the anode is small, so that the hydrogen concentration on the anode side is reduced slowly. If gas replacement with a replacement gas is carried out on the anode side before the hydrogen concentration on the anode side is reduced, a reaction of oxygen in the replacement gas (e.g., air) with hydrogen deteriorates the electrolyte membrane/electrode assembly.

In addition, the longer the soak time, the greater the deterioration of the electrolyte membrane which is caused by radicals (OH radicals) during soaking as a result of the cell voltage being held in the vicinity of an open circuit voltage (OCV) after power generation is stopped.

In consideration of a decrease in the amount of deterioration of the electrolyte membrane/electrode assembly according to a gentle reduction in hydrogen concentration and an increase in the amount of deterioration of the electrolyte membrane/electrode assembly according to the elapsed time of soaking, gas replacement on the anode side is executed at a predetermined timing after power generation is stopped, e.g., at a timing at which the sum of the amount of deterioration of the electrolyte membrane/electrode assembly at the time of executing gas replacement on the anode side and the amount of deterioration of the electrolyte membrane/electrode assembly caused by radicals during soaking is minimized, thereby maximizing suppression of the deterioration of the electrolyte membrane/electrode assembly.

Moreover, hydrogen in the anode is replaced with a replacement gas after the gas replacement, so that deterioration of the electrolyte membrane/electrode assembly caused by radicals during soaking can be suppressed.

Furthermore, unlike the fuel cell system of Japanese Unexamined Patent Application Publication No. 2004-22487, the fuel cell system according to the embodiments does not need a tank to store a gas.

Therefore, the fuel cell system according to the embodiments even with a simple and compact configuration can effectively suppress deterioration of the electrolyte membrane/electrode assembly.

In the method according to the embodiments, the predetermined timing may be when a concentration of the fuel gas on the anode side of the fuel cell becomes equal to or lower than a threshold concentration.

The amount of deterioration of the electrolyte membrane/electrode assembly caused by gas replacement and the amount of deterioration of the electrolyte membrane/electrode assembly caused by radicals during soaking both depend on the concentration of the fuel gas in the anode. Therefore, each amount of deterioration of the electrolyte membrane/electrode assembly can be suppressed to the minimum by executing the gas replacing process when the concentration of the fuel gas becomes equal to or lower than the threshold concentration.

In the method according to the embodiments, whether the in-stop-mode power generating process is executed may be determined based on an anode pressure when power generation of the fuel cell is stopped.

In the method according to the embodiments, whether the in-stop-mode power generating process is executed may be determined based on an accumulated current value from the point of detecting the instruction to stop the operation of the fuel cell to the point of stopping power generation.

When the in-stop-mode power generating process is executed, nitrogen spreads to the rear portion of a cathode pipe, so that the concentration of oxygen in the cathode becomes 0% for a long period of time. Therefore, whether the in-stop-mode power generating process is executed can be determined by detecting the reduction in the oxygen concentration of the cathode. However, many fuel cell systems are not provided with a cathode oxygen sensor. According to the subject matters recited in the paragraphs (4) and (5), therefore, whether the in-stop-mode power generating process is executed may be determined based on the anode pressure that is reduced by the in-stop-mode power generating process in which supply of the fuel gas is stopped, and that is detected by an anode pressure sensor which is generally provided, or may be determined based on an accumulated current value which is generally calculated. This makes it possible to determine whether the in-stop-mode power generating process is executed, without increasing the cost.

With the method according to the embodiments, the fuel cell is caused to generate power after supply of the fuel gas is stopped, and then the gas replacing process is executed at a predetermined timing at which the amount of deterioration of the electrolyte membrane/electrode assembly becomes small, so that deterioration of the fuel cell can be suppressed as much as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A method of stopping an operation of a fuel cell system having a fuel cell to generate power according to an electrochemical reaction of an oxide gas supplied to a cathode side of an electrolyte membrane/electrode assembly with a fuel gas supplied to an anode side of the electrolyte membrane/electrode assembly, an oxide-gas supply apparatus to supply the oxide gas to the fuel cell, a fuel-gas supply apparatus to supply the fuel gas to the fuel cell, and a gas replacement apparatus to supply a replacement gas to the anode side of the fuel cell to replace the fuel gas on the anode side with the replacement gas, the method comprising:

an in-stop-mode power generating process of, if an instruction to stop an operation of the fuel cell is detected, stopping supply of the fuel gas, supplying the oxide gas to the fuel cell to generate power from the oxide-gas supply apparatus, and stopping power generation of the fuel cell;

a determination process of determining whether or not the power generating process in the stop mode is executed; and a gas replacing process of, after the power generation of the fuel cell is stopped, activating the gas replacement apparatus at a predetermined timing to supply a replacement gas to the anode side of the fuel cell to replace the fuel gas on the anode side with the replacement gas, wherein, in a case in which the determination process determines that the power generating process in the stop mode is executed, the gas replacing process is executed at a timing later than a case in which the determination process determines that the power generating process in the stop mode is not executed.

2. The method according to claim 1, wherein
the predetermined timing is determined based on an amount of deterioration of the electrolyte membrane/electrode assembly when the gas replacing process is executed at or after a timing at which the power generation of the fuel cell is stopped, and an amount of deterioration of the electrolyte membrane/electrode assembly in a soaked state at or after the timing at which the power generation of the fuel cell is stopped.

3. The method according to claim 1, wherein
the predetermined timing is when a concentration of the fuel gas on the anode side of the fuel cell becomes equal to or lower than a threshold concentration.

4. The method according to claim 1, wherein
whether the in-stop-mode power generating process is executed is determined based on an anode pressure when the power generation of the fuel cell is stopped.

5. The method according to claim 1, wherein
whether the in-stop-mode power generating process is executed is determined based on an accumulated current value from a point of detecting the instruction to stop the operation of the fuel cell to a point of stopping the power generation of the fuel cell.

6. The method according to claim 1, wherein
in the in-stop-mode power generating process, when a pressure on the anode side reaches to a first predetermined pressure, the supply of the fuel gas is stopped.

7. The method according to claim 6, wherein
in the in-stop-mode power generating process, the pressure on the anode side becomes equal to or lower than a second predetermined pressure, the supplying of the oxide gas is stopped.

8. The method according to claim 7, wherein
the first predetermined pressure is higher than the second predetermined pressure.

* * * * *